July 14, 1942.
L. A. WOOD ET AL
2,289,563
BRAKE CONTROL FOR AUTOMOTIVE VEHICLES
Filed Nov. 25, 1939
2 Sheets-Sheet 2
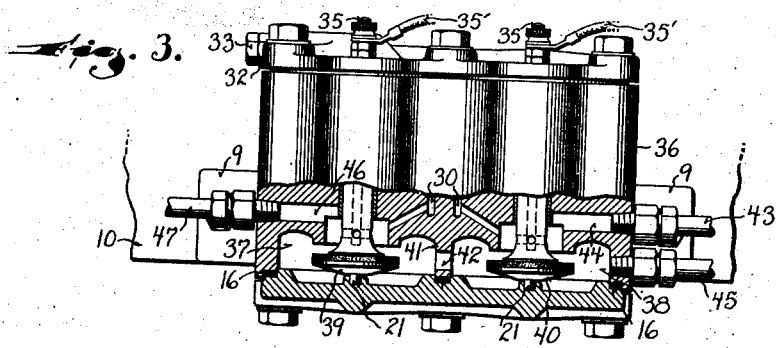
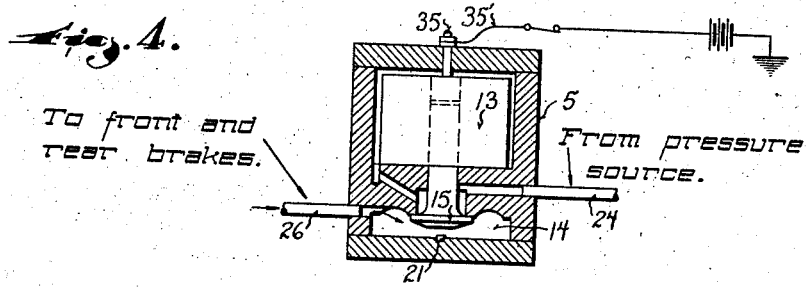
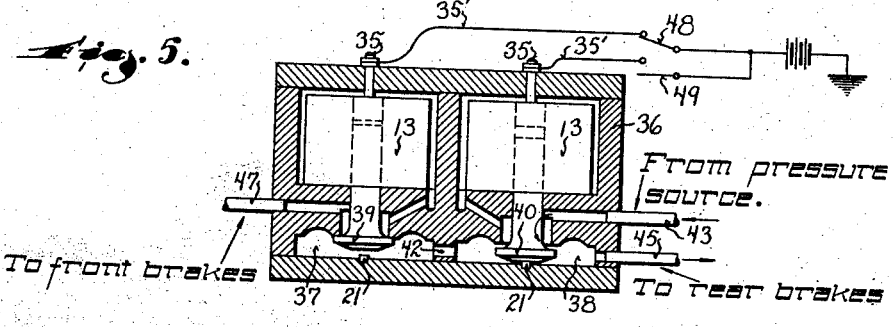
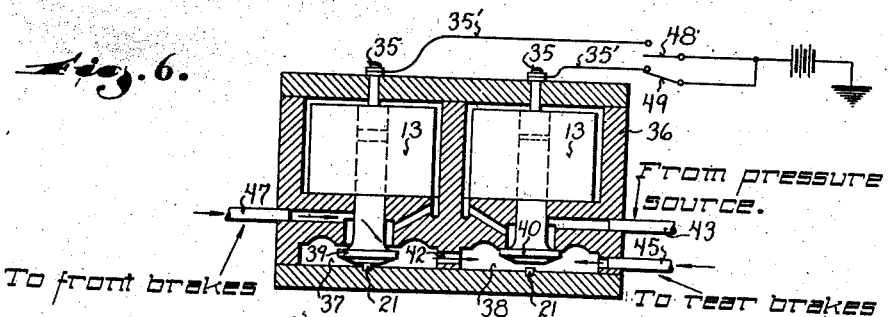
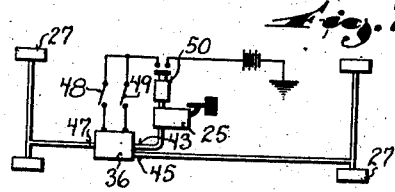
Inventors
Leo A. Wood
Wallace E. Weller Patented July 14, 1942

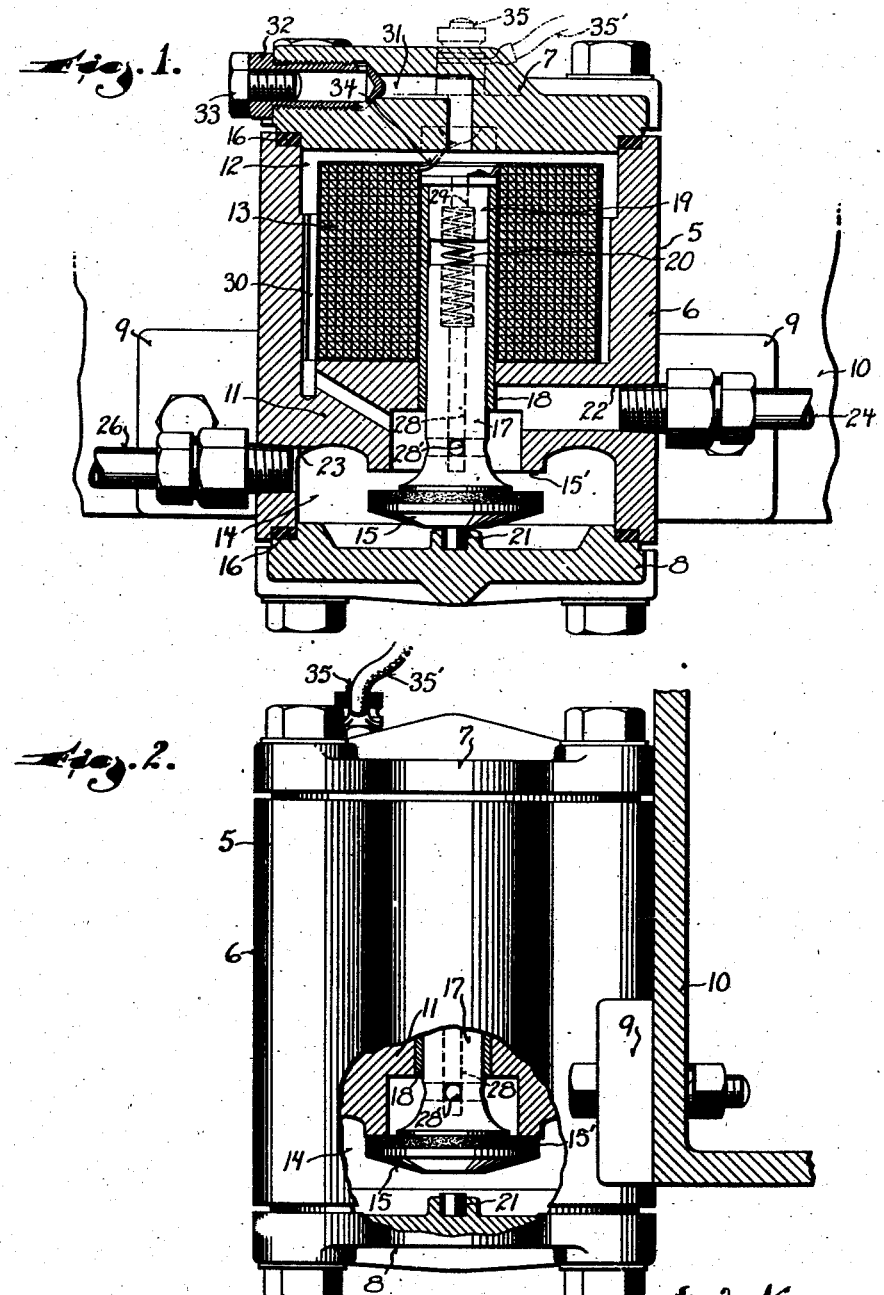

2,289,563

UNITED STATES PATENT OFFICE 2,289,563

BRAKE CONTROL FOR AUTOMOTIVE VEHICLES

Leo A. Wood and Wallace E. Weller, Fond du Lac, Wis.

Application November 25, 1939, Serial No. 306,174

6 Claims. (Cl. 188—152)

This invention relates to fluid pressure braking systems for automotive vehicles and is a continuation in part of the copending application of Leo A. Wood and Wallace E. Weller, Serial No. 141,722, filed May 10, 1937, now Patent No. 2,181,717.

In the aforesaid application means are provided for completely disconnecting the front wheel brakes from the braking system at the will of the driver. Hence, when the driver encounters slippery pavements, he can eliminate the danger of skidding due to loss of steering traction resulting from having the front wheel brakes lock. This desideratum is achieved by interposing a normally open valve in the fluid pressure line leading from the central fluid pressure source to the front wheel brake actuators and providing manually controlled means for closing this valve.

The present invention contemplates the use of similar valve means for locking all or some of the brakes "on" after they have been applied.

The advantages of this expedient will be clear from the following illustration:

Assume that a heavy transport truck going up a grade has a flat tire. With the braking equipment heretofore in use, the driver would be in a precarious predicament unless he had a companion; for almost invariably the parking or emergency brake is incapable of holding a loaded truck on a hill.

If he has a companion with him, he can keep the service brake applied until the companion finds a block or stone and places it behind one of the wheels.

With the present invention, the driver need only throw a switch and thereupon, the service brakes become automatically locked.

Another object of this invention resides in the provision of a braking system of the character described wherein means are provided for disconnecting the front wheel brakes as in the aforesaid application in combination with means for locking all, or only the rear brakes.

A further object of this invention is to provide a simple valve structure wherein both of the valve means are contained within a single housing which is connected in and forms part of the fluid system.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best modes so far devised for the practical application of the principles thereof, and in which:

Figure 1 is a longitudinal sectional view through the control unit or valve mechanism;

Figure 2 is a side view thereof with parts broken away and in section to illustrate the valve in its closed position;

Figure 3 is a front view partly broken away and in section showing a modified embodiment of the invention wherein two electromagnetically controlled valves are mounted within a single housing;

Figure 4 is a diagrammatic view illustrating the manner in which all of the brakes may be locked;

Figure 5 is a diagrammatic view illustrating the manner in which the dual valve unit may be used to disconnect the front wheel brakes while leaving the rear wheel brakes free for normal operation;

Figure 6 is a view similar to Figure 5 illustrating the manner in which the dual valve unit may be used to lock all of the brakes; and Figure 7 is a diagrammatic view illustrating the manner in which the dual form of the valve mechanism is connected in the complete braking system.

Referring now particularly to the accompanying drawings, in which like numerals indicate like parts, the numeral 5 designates a housing for the valve and its actuating electromagnet. This housing comprises a body portion 6 having top and bottom end plates or covers 7 and 8, respectively, closing the ends thereof. Flanges 9 provide means for bolting the entire structure to the chassis 10 of an automotive vehicle.

A horizontal partition wall 11 divides the interior of the housing into an upper compartment 12 in which the solenoid 13 of the electromagnet is mounted and a lower valve chamber 14 in which the valve 15 is located.

Suitable gaskets 16 are provided between the top and bottom covers and the adjacent ends of the housing body to insure leak-proof junctures, which is essential inasmuch as the housing is connected in and forms part of the fluid system.

The valve 15 is secured to the lower end of a stem 17 of magnetic metal slidably guided in a nonmagnetic sleeve 18 for movement to and from engagement with a valve seat 15' formed by the lower edge of a dome-like projection of the valve chamber. The upper end of the sleeve is closed by a plug 19 of magnetic metal to insure a better iron circuit for the electromagnet.

A coil spring 20 of nonmagnetic material is interposed between the plug 19 and the adjacent upper end of the valve stem to yieldingly urge the valve down to its open position.

Magnetic "freezing" of the valve in its open position is obviated by having it rest on a nonmagnetic plug 21 set in the bottom wall 8; and when the valve is closed, the upper end of its stem is spaced slightly from the plug 19.

An inlet port 22 connects with the dome-like projection of the valve chamber 14 above the valve seat 15' and an outlet port 23 connects with the valve chamber below the valve seat. Hence, when the valve is closed, retrograde fluid flow is prevented.

The inlet port 22 is connected through a suitable duct 24 with the central fluid pressure source indicated at 25 in the diagrammatic illustration of Figure 7; while the outlet port 23 is connected through a suitable duct 26 and branches thereof with all of the brake actuators designated 27 in the diagrammatic illustration of Figure 7.

To insure free valve action unrestrained by any dashpot action, the valve stem has a central bore 28 opening at its upper end to the socket which receives the spring 20 and at its lower end to radial ports 28'. The plug 19 also has a bore 29 therethrough so that there is a free flow of fluid through the solenoid of the electromagnet, the space above the solenoid being connected through a port 30 with the dome-like projection of the valve chamber 14 above the valve seat 15'. This freedom of fluid flow also enables withdrawing the entrapped air from the housing at the time the unit is installed.

For this purpose, the upper cover 7 has a port 31 opening to its underside and leading to the atmosphere. The outer end of this port is tapped to receive a hollow needle valve 32 which, when backed off its seat, establishes an open communication from the compartment 12 to the atmosphere.

After all entrapped air is removed, the needle valve is screwed down tight on its seat. During installation of the device, a filler hose is screwed into the hollow needle valve and the valve backed off its seat to allow filling the interior of the housing with liquid. A cap screw 33 is screwed into the open end of the needle valve after filling to protect the internal threads of the valve.

One end of the solenoid is grounded to the housing and its other end 34 is connected to a terminal 35 which extends through the cover 7 but is electrically insulated therefrom. The outer end of this terminal has a lead 35' connected thereto by which the solenoid may be connected with the positive side of the battery, either through a single manually operable controlling switch or through such a manually operable switch in series with a fluid pressure actuated switch, as illustrated in Figure 7.

From the description thus far, it will be seen that normally the valve is held open, permitting free flow of fluid from the pressure source to the brake actuators and that when the solenoid is energized, the valve is closed to prevent retrograde fluid flow from the brake actuators, thus locking all of the brakes in their "on" positions.

The valve, when closed, is maintained closed by back pressure, thereby requiring the solenoid to be energized only momentarily through actuation of a push button switch after the brakes are applied. This prevents draining of the storage battery of the vehicle, especially if the brakes are to be locked "on" for any considerable period of time.

To release the brakes, it is only necessary to depress the foot brake until the pressure at opposite sides of the valve substantially balances, whereupon the valve is opened by the spring 20.

It may be desirable to incorporate the brake locking feature with the "lock out" feature of the aforesaid copending application. This is conveniently accomplished by duplicating the valve and electromagnet structure, as illustrated in Figure 3. In this instance, the housing 36 is large enough to have two valve chambers 37 and 38, as well as two solenoid compartments, in association therewith. The respective valves 39 and 40 operate in identically the same manner as hereinbefore described. Both are normally held open by their springs.

The partition wall 41 which separates the two units has a passage 42 therethrough so that the two valve chambers are connected. Fluid pressure is conducted from the central pressure source through a duct 43 and an inlet port 44 to the valve chamber 38 above the valve seat.

The rear brakes have their actuators connected with the valve chamber 38 through a duct 45 and its branches which opens to the valve chamber 38 below the valve seat; while the front brakes have their actuators connected with the valve chamber 37 above the valve seat through a port 46 and a duct 47 and its branches.

The solenoids of the two units are separately and selectively connectible with the source of electrical energy through switches 48 and 49 and a fluid pressure actuated switch 50 (see Figure 7).

With this embodiment of the invention, it is possible to "lock out" the front brakes to prevent loss of steering traction on slippery pavements as defined more at length in the aforesaid copending application, by energizing the solenoid which controls the valve in the chamber 37. This situation is diagrammatically illustrated in Figure 5; and as will be readily apparent from this view, fluid pressure cannot reach the front brake actuators but is free to flow to and from the rear wheel brake actuators.

If both solenoids are energized by closure of the switches 48 and 49, the rear brakes will be locked upon being applied.

In every instance where the brakes have been locked in the manner described, they are easily released by first applying the brakes to equalize the pressure on opposite sides of the valves and then opening the switches controlling energization of the solenoids. In this manner the master cylinder or central pressure source is guarded against damage resulting from the release of back pressure from the brake actuator.

Obviously, if the solenoid controlling the valve in the chamber 37 is left deenergized and only the other solenoid is energized, all of the brakes may be locked "on." This condition is illustrated diagrammatically in Figure 6.

From the foregoing description taken in connection with the accompanying drawings, it will be readily apparent that this invention provides a novel fluid pressure braking system having means for locking some, or all of the brakes "on" and for disconnecting the front wheel brakes from the system at the will of the operator.

What we claim as our invention is:

1. In a fluid pressure braking system for automotive vehicles: a central pressure source under control of a manually operable brake applying member; a plurality of individual brake actuators; connections from the brake actuators to the central pressure source; normally open check valve means in the connections between certain of the brake actuators and the central pressure source operable to prevent retrograde fluid flow from said actuators; and electromagnetic means under control of the operator of the vehicle for closing said check valve means to lock the brakes controlled by said actuators, said check valve means closing in a direction such as to be maintained closed by back pressure in the system at the side of the valve means opposite the central pressure source.

2. In a fluid pressure braking system for automotive vehicles: a central pressure source under control of a manually operable brake applying member; an individual brake actuator for each wheel of the vehicle; connections from the central pressure source to said brake actuators; check valve means in the connections operable when closed to prevent retrograde fluid flow from the actuators; an electromagnet for closing the check valve means; said check valve means closing in a direction such as to be maintained closed by back pressure in the system at the side of the valve means opposite the central pressure source; and an energizing circuit controlled by a switch accessible to the operator of the vehicle for energizing said electromagnet.

3. In a fluid pressure braking system for automotive vehicles: a central pressure source under control of a manually operable brake applying member; a plurality of brake actuators; connections from said brake actuators to the central pressure source; check valve means in said connections for preventing retrograde fluid flow from said brake actuators; an electromagnet for closing said check valve means; an energizing circuit for said electromagnet including two switches connected in series so that both must be closed to effect energization of the electromagnet, one of said switches being directly manually operable and accessible to an operator of the vehicle; and fluid pressure means actuated from the central pressure source upon manual actuation of the brake applying member for closing the other switch.

4. In a fluid pressure operated braking system for automotive vehicles: a central pressure source under control of a manually operable brake applying member; a plurality of individual brake actuators; closed connections between said brake actuators and the central pressure source; a closed valve housing in and forming part of the connections between the pressure source and the brake actuators; normally open check valve means in said housing operable when closed to prevent retrograde fluid flow from the brake actuators so as to lock the brakes "on" after being applied; electromagnetic means also enclosed within said housing for closing said check valve means; said check valve means closing in a direction such as to be maintained closed by back pressure in the system at the side of the valve means opposite the central pressure source; and an energizing circuit for the electromagnet having a controlling switch accessible to the driver of the vehicle.

5. In a fluid pressure operated braking system for automotive vehicles: a central pressure source under control of a manually operable brake applying member; a plurality of individual brake actuators; closed connections between said brake actuators and the central pressure source; a closed valve housing in and forming part of the connections between the pressure source and the brake actuators; a partition in said housing dividing the same into two compartments, said partition having a passage therethrough to communicate said compartments; normally open check valve means in each of said compartments, only one of said compartments being connected with the fluid pressure source, and each compartment being connected to one set of brake actuators; an electromagnet for each check valve means enclosed within its respective compartment and operable upon energization to close the check valve means; and means under control of the operator of the vehicle for energizing said electromagnets at will, said check valve means for the compartment connected with the fluid pressure source being adapted to be maintained closed after energization of its electromagnet by fluid pressure in the system at the side of the valve means opposite the central pressure source.

6. In a hydraulic brake system having a brake actuated in response to fluid pressure within a brake cylinder and produced in a master cylinder connected with the brake cylinder: a manual brake applying member connected with the plunger of the master cylinder and movable from a normally inactive position to an operative position to produce a rise in fluid pressure in the master cylinder and consequently the entire system; normally open check valve means in the connection between the cylinders operable when closed to maintain fluid pressure in the brake cylinder and maintained closed as a result of fluid pressure in the system at the brake cylinder side of the valve means; and means under control of an operator of the system for closing said check valve means so that closure of the same during an increased pressure condition in the system maintains the brake locked "on" until subsequent manual actuation of the brake applying member toward operative position effects opening of the valve means upon the attainment of an approximate balance in fluid pressure in the system at opposite sides of the valve means.

LEO A. WOOD.
WALLACE E. WELLER.